(12) United States Patent
Ito (10) Patent No.: US 10,654,321 B2
(45) Date of Patent: *May 19, 2020

(54) PNEUMATIC TIRE

(71) Applicant: Sumitomo Rubber Industries, Ltd., Kobe-shi, Hyogo (JP)

(72) Inventor: Kae Ito, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 251 days.

This patent is subject to a terminal disclaimer.

(21) Appl. No.: 15/292,352

(22) Filed: Oct. 13, 2016

(65) Prior Publication Data

US 2017/0106700 A1 Apr. 20, 2017

(30) Foreign Application Priority Data

Oct. 14, 2015 (JP) .................................. 2015-203077

(51) Int. Cl.
*B60C 11/12* (2006.01)
*B60C 11/11* (2006.01)
*B60C 11/03* (2006.01)

(52) U.S. Cl.
CPC ...... *B60C 11/1236* (2013.01); *B60C 11/0304* (2013.01); *B60C 11/0306* (2013.01);
(Continued)

(58) Field of Classification Search
CPC ............. B60C 11/1204; B60C 11/1236; B60C 11/0304; B60C 11/0306;
(Continued)

(56) References Cited

U.S. PATENT DOCUMENTS

2008/0115870 A1* 5/2008 Ohashi ................... B60C 11/12
152/209.15
2012/0216931 A1* 8/2012 Shiono ................ B60C 11/0306
152/209.18
(Continued)

FOREIGN PATENT DOCUMENTS

CA 2776559 A1 * 5/2011 .............. B60C 11/11
DE 102009044620 A1 5/2011
(Continued)

OTHER PUBLICATIONS

Machine translation of JP2009-241882 (no. date).*
(Continued)

*Primary Examiner* — Steven D Maki
*Assistant Examiner* — Philip N Schwartz
(74) *Attorney, Agent, or Firm* — Birch, Stewart, Kolasch & Birch, LLP (57) ABSTRACT

A pneumatic tire comprises a tread portion provided with crown main grooves, center axial grooves and center blocks including a siped center block with a first sipe. The siped center block has a pair of substantially v-shaped opposite first and second block side walls each having an outwardly protruding vertex. The first sipe has a wavy configuration at least partially. One end of the first sipe is positioned on one side in the tire circumferential direction of the vertex of the first block side wall, whereas the other end of the first sipe is positioned on other side in the tire circumferential direction of the vertex of the second block side wall.

13 Claims, 6 Drawing Sheets

(52) U.S. Cl.
CPC ............ *B60C 11/11* (2013.01); *B60C 11/1204* (2013.01); *B60C 2011/0341* (2013.01); *B60C 2011/0346* (2013.01); *B60C 2011/0358* (2013.01); *B60C 2011/1213* (2013.01); *B60C 2200/06* (2013.01)

(58) Field of Classification Search
CPC ..... B60C 2011/0358; B60C 2011/0367; B60C 2011/0341; B60C 2011/1213; B60C 2200/06; B60C 2200/065
See application file for complete search history.

(56) References Cited

U.S. PATENT DOCUMENTS

| | | | | |
|---|---|---|---|---|
| 2012/0305155 | A1* | 12/2012 | Hamanaka | B60C 11/11 152/209.18 |
| 2013/0098519 | A1* | 4/2013 | Maehara | B60C 11/0306 152/209.22 |
| 2013/0186533 | A1* | 7/2013 | Kaneko | B60C 11/032 152/209.17 |
| 2015/0352903 | A1* | 12/2015 | Ookawa | B60C 11/0306 152/209.18 |

FOREIGN PATENT DOCUMENTS

| | | | | |
|---|---|---|---|---|
| EP | 2583839 | A2 | 4/2013 | |
| JP | 2002046426 | A * | 2/2002 | ............ B60C 11/12 |
| JP | 2009241882 | A * | 10/2009 | ............ B60C 11/11 |
| JP | 2011-98622 | A | 5/2011 | |
| JP | 2013-189099 | A | 9/2013 | |
| JP | 2014-104769 | A | 6/2014 | |

OTHER PUBLICATIONS

Machine translation of JP2002-046426 (no date).*
Extended European Search Report for European Application No. 16190951.0, dated Mar. 2, 2017.

* cited by examiner

PNEUMATIC TIRE

TECHNICAL FIELD

The present invention relates to a pneumatic tire whose center blocks disposed in the tread portion are improved in the uneven wear resistance.

BACKGROUND ART

For example, the following patent document 1 discloses a pneumatic tire provided with a plurality of center blocks having a hexagonal tread, and the center blocks are provided with sipes extending across the blocks' treads in the tire axial direction. Such sipes can mitigate deformation of the treads when contacting with the ground. Therefore, it is expected the heel and toe wear of the center block is controlled.

In the patent document 1, both ends of the sipe are positioned at vertices of the respective side walls of the block protruding outwardly of the block (vertices of the hexagonal shape of the tread).

In general, the center blocks are subjected to higher ground pressure, therefore, larger stress occurs in the vicinities of the vertices of the block side walls. Accordingly, the sipes disclosed in the patent document 1 tend to cause uneven wear in the vicinities of the vertices of the block side walls of the center blocks. Therefore, in the pneumatic tire of the patent document 1, there is room for further improvement in the uneven wear resistance of the center blocks.

Patent document 1: Japanese Patent Application Publication No.2011-98622

SUMMARY OF THE INVENTION

Problems to be Solved by the Invention

It is therefore, an object of the present invention to provide a pneumatic tire in which center blocks are improved in the uneven wear resistance.

Means of Solving the Problems

According to the present invention, a pneumatic tire comprises a tread portion provided with a pair of crown main grooves disposed one on each side of the tire equator, and extending continuously in the tire circumferential direction, a plurality of center axial grooves connecting between a pair of the crown main grooves, and a plurality of center blocks divided by a pair of the crown main grooves and the center axial grooves, wherein the center blocks include a siped center block, the siped center block has a first block side wall and a second block side wall respectively extending along a pair of the crown main grooves, and is provided with a first sipe extending from the first block side wall to the second block side wall, in the top view of the siped block, the first block side wall and the second block side wall are substantially v-shaped to have a vertex protruding outwardly of the block, and the first sipe has a wavy configuration at least partially of its length, and one end in the tire axial direction of the first sipe is positioned on one side in the tire circumferential direction of the vertex of the first block side wall, whereas the other end in the tire axial direction of the first sipe is positioned on the other side in the tire circumferential direction of the vertex of the second block side wall.

In the pneumatic tire according to the present invention, it is preferable that the first sipe comprises a first portion including one end, a second portion including the other end, and a third portion between the first portion and the second portion, each of the first portion and the second portion has a wavy configuration extending in the tire axial direction while oscillating in the tire circumferential direction, the first portion is disposed in a different position in the tire circumferential direction than the second portion, and the third portion extends straight while inclining with respect to the tire axial direction.

In the pneumatic tire according to the present invention, it is preferable that regions of the center block subdivided by the first sipe are provided with second sipes, and each of the second sipes protrudes from the extent in the tire axial direction of the third portion toward the both sides thereof in the tire axial direction.

In the pneumatic tire according to the present invention, it is preferable that the tread portion is further provided with a plurality of middle axial grooves extending axially outwardly from each of the crown main grooves, and the middle axial grooves are disposed at positions opposed to the vertices.

In the pneumatic tire according to the present invention, it is preferable that the above-mentioned one end of the first sipe is positioned within the extent in the tire circumferential direction of the middle axial groove being opposite to the vertex of the first block side wall, and the above-mentioned other end of the first sipe is positioned within the extent in the tire circumferential direction of the opening to the crown main groove of the middle axial groove being opposite to the vertex of the second block side wall.

In the pneumatic tire according to the present invention, it is preferable that the first block side wall and the second block side wall are each provided with a slot denting in the tire axial direction, and one end and the other end of the first sipe are connected to the respective slots.

In the pneumatic tire according to the present invention, it is preferable that at least part of the first sipe has a wavy configuration whose amplitude is less than a length in the tire circumferential direction of the slot.

In the pneumatic tire according to the present invention, it is preferable that the tread portion is further provided with shoulder main grooves extending continuously in the tire circumferential direction, and disposed axially outside the crown main grooves, a plurality of middle axial grooves connecting between the crown main grooves and the shoulder main grooves, and a plurality of middle blocks divided by the crown main grooves, the shoulder main grooves, and the middle axial grooves, the middle blocks include a siped middle block, the siped middle block is provided with a middle first sipe extending from a block side wall on one side in the tire axial direction to a block side wall on the other side in the tire axial direction, the middle first sipe comprises a first portion and a second portion which are shifted from each other in the tire circumferential direction, and a third portion extending straight between the first portion and the second portion while inclining with respect to the tire axial direction, each of the middle axial grooves comprises, from the crown main groove side, a first portion, a second portion and a third portion which are inclined with respect to the tire axial direction to the same direction, the angle with respect to the tire axial direction of the second portion is more than the angles with respect to the tire axial direction of the first portion and the third portion the second portion, the second portion has an axial length so as to protrude from the axial extent of the third portion of the middle first sipe toward both sides in the tire axial direction.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

The term "sipe" means a very narrow groove having a width in a range of from 0.5 to 1.5 mm and thus distinguished from grooves serving for drainage.

DESCRIPTION OF THE PREFERRED EMBODIMENTS

The present invention can be applied to various kinds of pneumatic tires, but suitably applied to heavy duty tires such as truck/bus tires. Thus, in conjunction with the accompanying drawings, an embodiment of the present invention will now be described in detail, taking a heavy duty as an example.

As well known in the art, a heavy duty pneumatic tire comprises a tread portion whose outer surface defines the tire tread, a pair of axially spaced head portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

Figure 1:
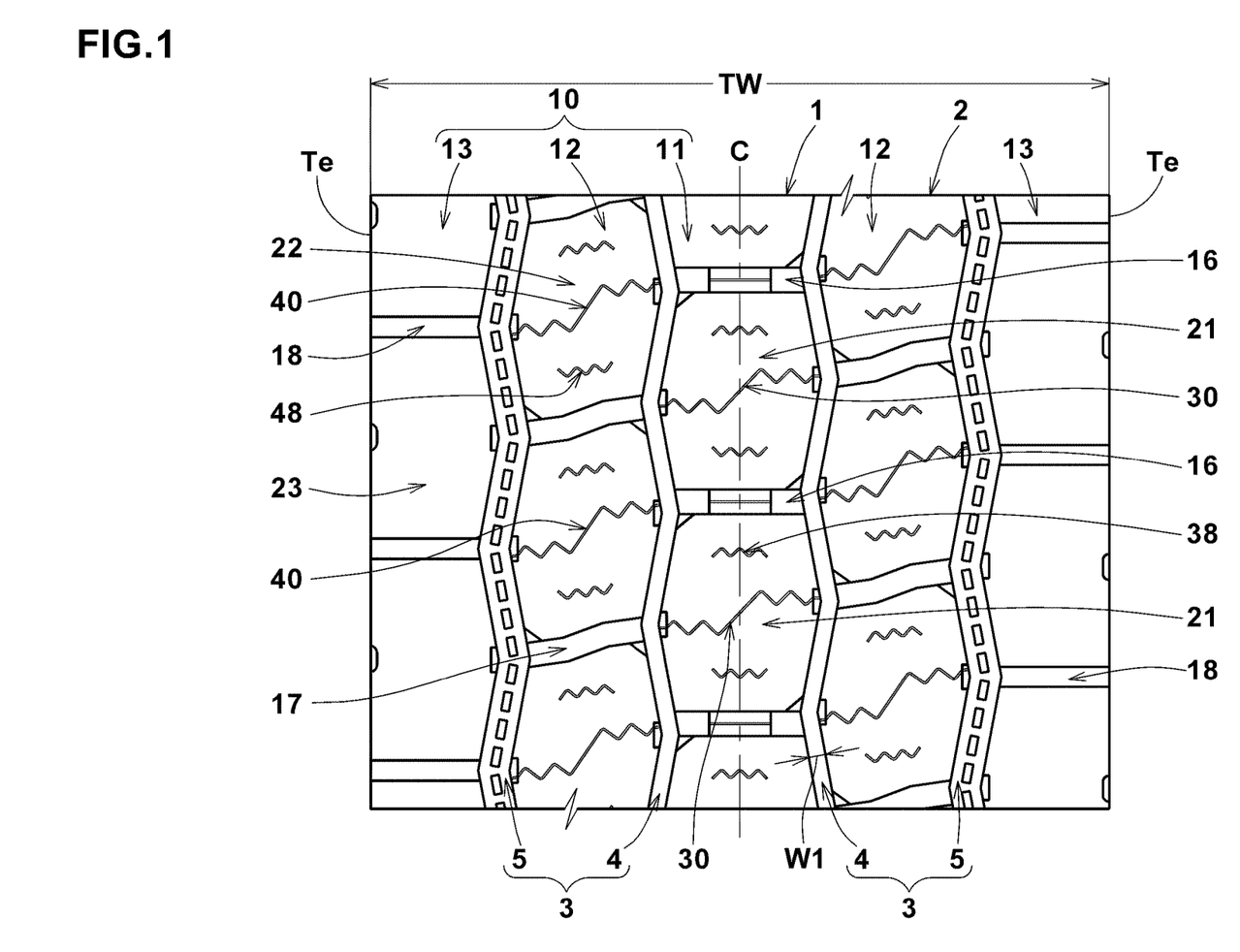
FIG. 1 is a developed plan view showing the tread portion of a pneumatic tire as an embodiment of the present invention.

FIG. 1 shows the tread portion 2 of the tire 1 as an embodiment.

As shown in FIG. 1, the tread portion 2 is provided with land regions 10 axially divided by main grooves 3 extending continuously in the tire circumferential direction.

The main grooves 3 in this example include a pair of axially outermost shoulder main grooves 5, and a pair of axially inner crown main grooves 4 disposed one on each side of the tire equator.

Each of the main grooves 3 in this example is a zigzag groove. But, the main groove 3 is not limited to a zigzag groove. The main groove 3 may be a straight groove.

It is preferable that each of the main grooves 3 has a groove width w1 in a range of from 1.5% to 5.0% of the tread width TW. In the case of the heavy duty pneumatic tires, it is preferable that each of the main grooves 3 has a groove depth of from 20 to 30 mm. Such main grooves 3 help to improve the wet performance and uneven wear resistance in good balance.

The land regions 10 in this example are a center land region 11 between the crown main grooves 4, two middle land regions 12 between the crown main grooves 4 and the shoulder main grooves 5, and two axially outermost shoulder land regions 13 axially outside the shoulder main grooves 5.

Each land region 10 is provided with axial grooves extending across its entire axial width and thereby circumferentially divided into blocks in a row.

Figure 2:
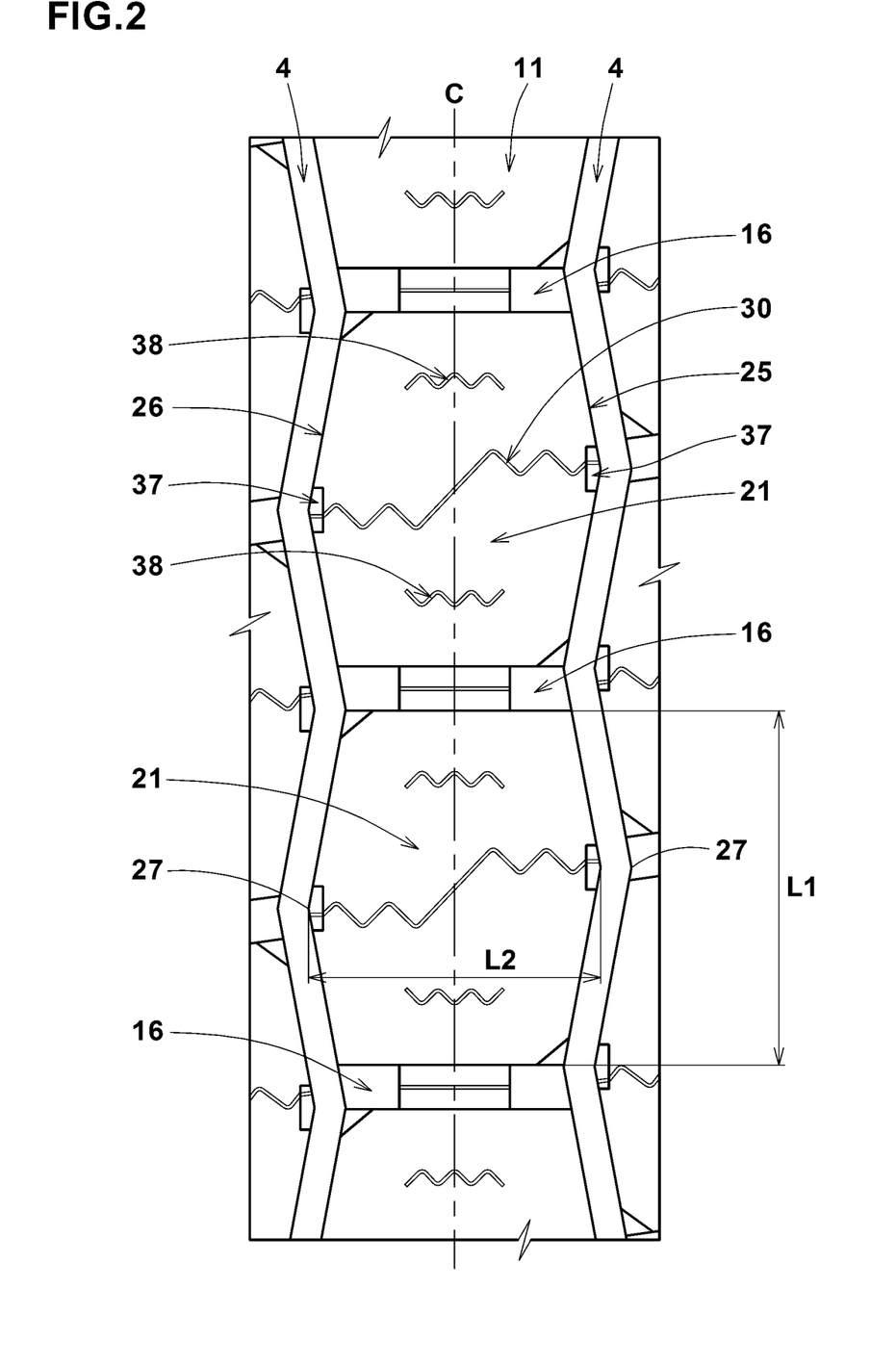
FIG. 2 is a closeup showing the center land region in FIG. 1.

As shown in FIG. 2, the center land region 11 is a row of circumferentially arranged center blocks 21 which are divided by the center axial grooves 16 connecting between the crown main grooves 4.

The center blocks 21 include a Biped center block provided with a first sipe 30. In this embodiment, each of the center blocks 21 is provided with a first sipe 30.

Figure 3:
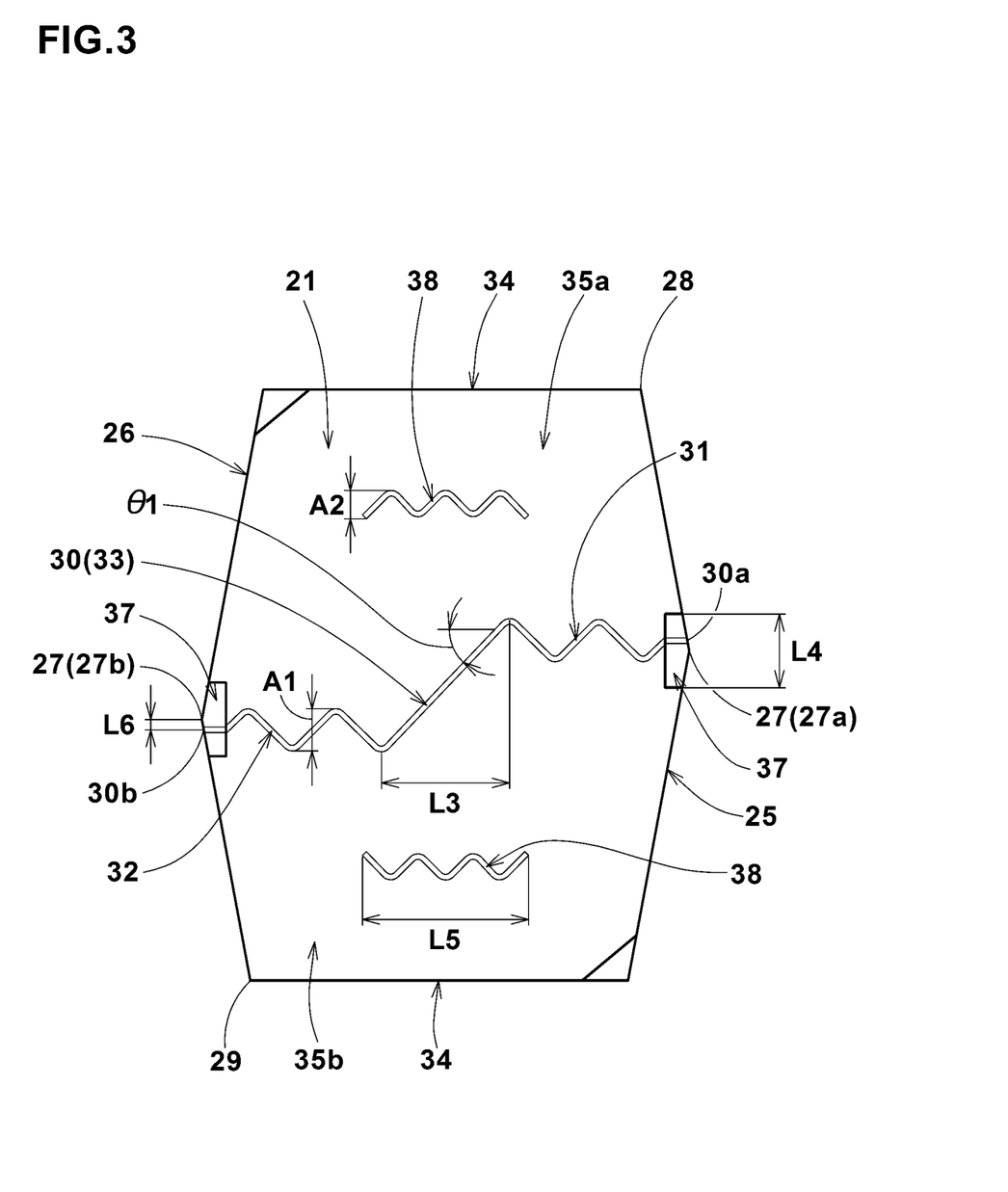
FIG. 3 is a closeup showing the center block in FIG. 2.

The center blocks 21 each has a first block side wall 25 and a second block side wall 26 as shown in FIG. 3.

The first block side wall 25 and the second block side wall 26 respectively extend along the crown main grooves 4.

In FIG. 3, the first block side wall 25 is on the right hand of the center block 21, and the second block side wall 26 is on the left hand of the center block 21.

The first block side wall 25 and the second block side wall 26 each have a substantially v-shaped configuration in the top view of the block to have a vertex 27 most protruding outwardly of the block.

In this embodiment, a pair of third block side walls 34 extending axially between the first block side wall 25 and the second block side wall 26 are parallel with each other and straight in the top view of the block.

Thereby, the center block 21 has a substantially hexagonal tread.

The first block side wall 25 and the second block side wall 26 in this example are each provided with a slot 37 denting in the tire axial direction.

The slot 37 in this example has a sloping surface extending radially inwardly from the block tread while inclining at an angle of from 10 to 20 degrees with respect to the tire radial direction.

During running in wet conditions, such slots 37 effectively lead the water wedged away by the block tread, to the main grooves, and consequently help to improve the wet performance.

The first sipe 30 extends from the first block side wall 25 to the second block side wall 26.

At least part of the first sipe 30 extends in a wavy form. Such first sipe can prevent the center block from being deformed largely when contacting with the ground as the opposite walls of the first sipe can engage with each other. Therefore, the uneven wear resistance of the center block 21 is improved.

One end 30a of the first sipe 30 is positioned on one side in the tire circumferential direction (upper side in FIG. 3) of the vertex 27a of the first block side wall 25, whereas the other end 30b of the first sipe 30 is positioned on the other side in the tire circumferential direction (under side in FIG. 3) of the vertex 27b of the second block side wall 26.

Since one end 30a and the other end 30b of the first sipe 30 are disposed off the vertices 27a and 27b of the block side walls 25 and 26 where large stress concentrates, the rigidity in the vicinities of the vertices 27a and 27b of the block side walls 25 and 26 can be maintained. Thereby, uneven wear of the center block 21 starting from the vertices can be controlled.

Further, since the regions 35a and 35b subdivided by the first sipe 30 each include one vertex of the block side wall, the rigidity of such regions are increased in good balance, and even wear is possible. Accordingly, the uneven wear of the center blocks 21 can be effectively controlled.

It is preferable that one end 30a and the other end 30b of the first sipe 30 are connected to the slots 37 of the block side walls 25 and 26, respectively. Such first sipe 30 can improve wet performance in cooperation with the slots 37.

The circumferential distances L6 from the vertices 27 of the block side walls 25 and 26 to one end 30a and the other end 30b of the first sipe 30 are preferably not less than 1.0 mm, more preferably not less than 1.5 mm, and preferably not more than 5.0 mm, more preferably not more than 3.0 mm.

Given that the first sipe 30 is composed of a first portion 31 including the above-mentioned one end 30a, a second portion 32 including the other end 30b, and a third portion 33 between the First portion 31 and the second portion 32, the first portion 31 and the second portion 32 in this example are disposed in circumferentially different positions. Such first portion 31 and second portion 32 mitigate the rigidity in the tire circumferential direction of the regions 35a and 35b subdivided by the first sipe 30, and consequently, impact on the heel-side edge and toe-side edge of the center block 21 can be reduced. Accordingly, the heel and toe wear of the center block 21 can be effectively controlled.

Preferably, the first portion 31 and the second portion 32 each have a wavy configuration extending in the tire axial direction while oscillating in the tire circumferential direction. In this embodiment, the first portion 31 extends in the tire axial direction with a constant amplitude, and the second portion 32 extends in the tire axial direction with a constant amplitude. Such first portion 31 and second portion 32 can maintain the rigidity of the center block 21 in both lateral portions as the opposite walls of the sipe can engage with each other, and consequently, the uneven wear resistance of the center block can be effectively improved.

The wavy configuration of each of the first and second portions 31 and 32 in this embodiment is a zigzag of about 1.75 cycles when counted form the end of the straight third portion 33.

In order to effectively derive this advantages effect, the peak-to-peak amplitude A1 in the tire circumferential direction of each of the first portion 31 and the second portion 32 is preferably set in a range of from 0.05 to 0.20 times the maximum length L1 in the tire circumferential direction (shown in FIG. 2) of the center block 21.

More preferably, the peak-to-peak amplitude A1 of each of the first portion 31 and the second portion 32 is less than the length L4 in the tire circumferential direction of the slot 37. Thereby, wear of the center block 21 progresses from the slot 37 side than the central part of the tread, and uneven wear of the central part of the tread of the block can be prevented.

In this example, it is preferable that the axial length of the first portion 31 is equal to the axial length of the second portion 32. Thereby, the center block 21 wears evenly, and the uneven wear resistance can be further improved.

The third portion 33 in this example extends straight while inclining with respect to the tire axial direction. The angle θ1 of the third portion 33 is, for example, 40 to 60 degrees with respect to the tire axial direction.

Such third portion 33 can effectively mitigate the deformation of the tread when contacting with the ground.

The axial length L3 of the third portion 33 is preferably not less than 0.20 times, more preferably not less than 0.25 times, and preferably not more than 0.35 times, more preferably not more than 0.30 times the maximum axial length L2 (shown in FIG. 2) of the center block 21.

Such third portion 33 helps to improve the wet performance and the uneven wear resistance in good balance.

The depth d2 of the first sipe 30 is preferably not less than 0.35 times, more preferably not less than 0.55 times, and preferably not more than 1.00 times, more preferably not more than 0.80 times the maximum depth d1 of the center axial groove 16 (shown in FIG. 2). Such first sipe 30 improves the contact of the block tread with the road surface, while maintaining the block rigidity, and consequently, the heel and toe wear of the block can be prevented.

It is preferable that the regions 35a and 35b subdivided by the first sipe 30 are each provided with a second sipe 38. The second sipe 38 in this example is an independent closed sipe which is connected with neither a groove nor a sipe, and of which both ends are terminated within the region (35a, 35b). Such second sipe 38 can mitigate deformation of the regions when contacting with the ground, while maintaining the rigidity of the center block 21.

In this example, on each side in the tire circumferential direction of the third portion 33 of the first sipe 30, a single second sipe 38 is disposed.

It is preferable that each of the second sipes 38 is arranged so as to protrude from the axial extent of the third portion 33 toward both sides in the tire axial direction.

It is preferable that the axial length L5 of the second sipe 38 is 1.25 to 1.35 times the axial length L3 of the third portion 33. Such second sipe 38 controls the deformation of the tread when contacting with the ground, while controlling the decrease in the rigidity of the center block 21, and consequently, the uneven wear resistance is improved.

The second sipe 38 in this example has a wavy configuration extending in the tire axial direction while oscillating in the tire circumferential direction. Thereby, deformation of the regions 35a and 35b when contacting with the ground can be further mitigated.

It is preferable that the peak-to-peak amplitude A2 in the tire circumferential direction of the second sipe 38 is less than the peak-to-peak amplitude A1 of each of the first portion 31 and the second portion 32 of the first sipe 30. Thereby, uneven wear at the edges of the second sipe 38 can be prevented.

Figure 4:
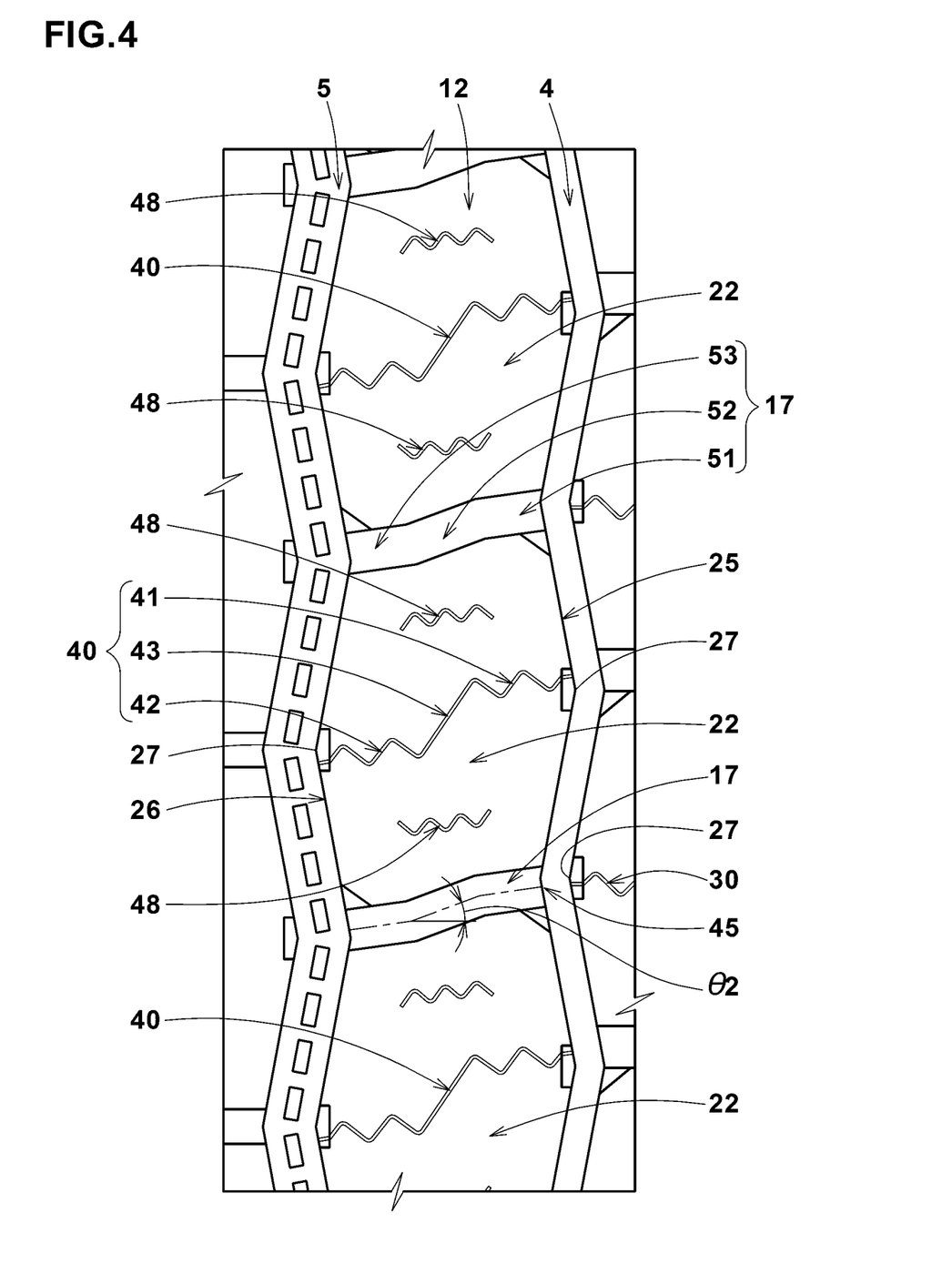
FIG. 4 is a closeup showing the middle land region in FIG. 1.

As shown in FIG. 4, each of the middle land regions 12 in this example is a row of the circumferentially arranged middle blocks 22. The middle blocks 22 are divided by the crown main grooves 4, the shoulder main grooves 5, and middle axial grooves 17 connecting therebetween.

In this embodiment, the middle block 22 has a similar configuration to the above described center block 21 (shown in FIG. 3). In the middle block 22 in this example and the center block 21 shown in FIG. 3, the same reference numbers are used for the same components. That is, the middle block 22 has the block side walls 25 and 26, and is provided with a middle first sipe 40 and middle second sipes 48.

The middle first sipe 40 has the same configuration as that of the first sipe 30 of the center block 21. That is, the middle first sipe 40 has a first portion 41 and a second portion 42 sifted from each other in the tire circumferential direction, and a third portion 43 extending straight between the first portion 41 and the second portion 42 while inclining with respect to the tire axial direction.

The middle second sipe 48 has the same configuration as that of the second sipe 38 of the center block 21. That is, the middle second sipe 48 is disposed on each side in the tire circumferential direction of the third portion 43 of the middle first sipe 40, and has a wavy configuration extending in the tire axial direction while oscillating in the tire circumferential direction.

It is preferable that the middle axial grooves 17 are disposed so that their axially inner ends are respectively opposite to the vertices 27 of the block side walls of the center blocks 21. During running in wet conditions, such middle axial grooves 17 lead the water in the crown main grooves 4 axially outward, and consequently, the wet performance is improved.

It is preferable that the above-mentioned one end and other end (shown in FIG. 3) of the first sipe 30 of each center block 21 are each positioned within the circumferential width of the adjacent opening 45 of the middle axial groove 17 toward the crown main groove 4. Such middle axial grooves 17 further improve the wet performance in cooperation with the first sipes 30.

Each of the middle axial grooves 17 in this example is inclined at an angle θ2 in a range of from the 5 to 15 degrees with respect to the tire axial direction, and has a bent point. More specifically, each of the middle axial grooves 17 has two bent point and is composed of a first portion 51, a second portion 52 and a third portion 53 inclined with respect to the tire axial direction to the same direction, and arranged in this order from the crown main groove 4.

The angle with respect to the tire axial direction of the second portion 52 is more than the angles with respect to the tire axial direction of the first portion 51 and the third portion 53. Such middle axial groove 17 may have a larger groove volume in compare with an axial groove extending straight, and can further improve the wet performance.

It is preferable that the central second portion 52 of the middle axial groove 17 has an axial length so as to protrude from the axial extent of the central third portion 43 of the middle first sipe 40 toward both sides in the tire axial direction. Thereby, the progresses of wear can be evened between the central region and longitudinal regions in the tire circumferential direction of the middle block 22, and consequently, the uneven wear resistance can be improved.

Figure 5:
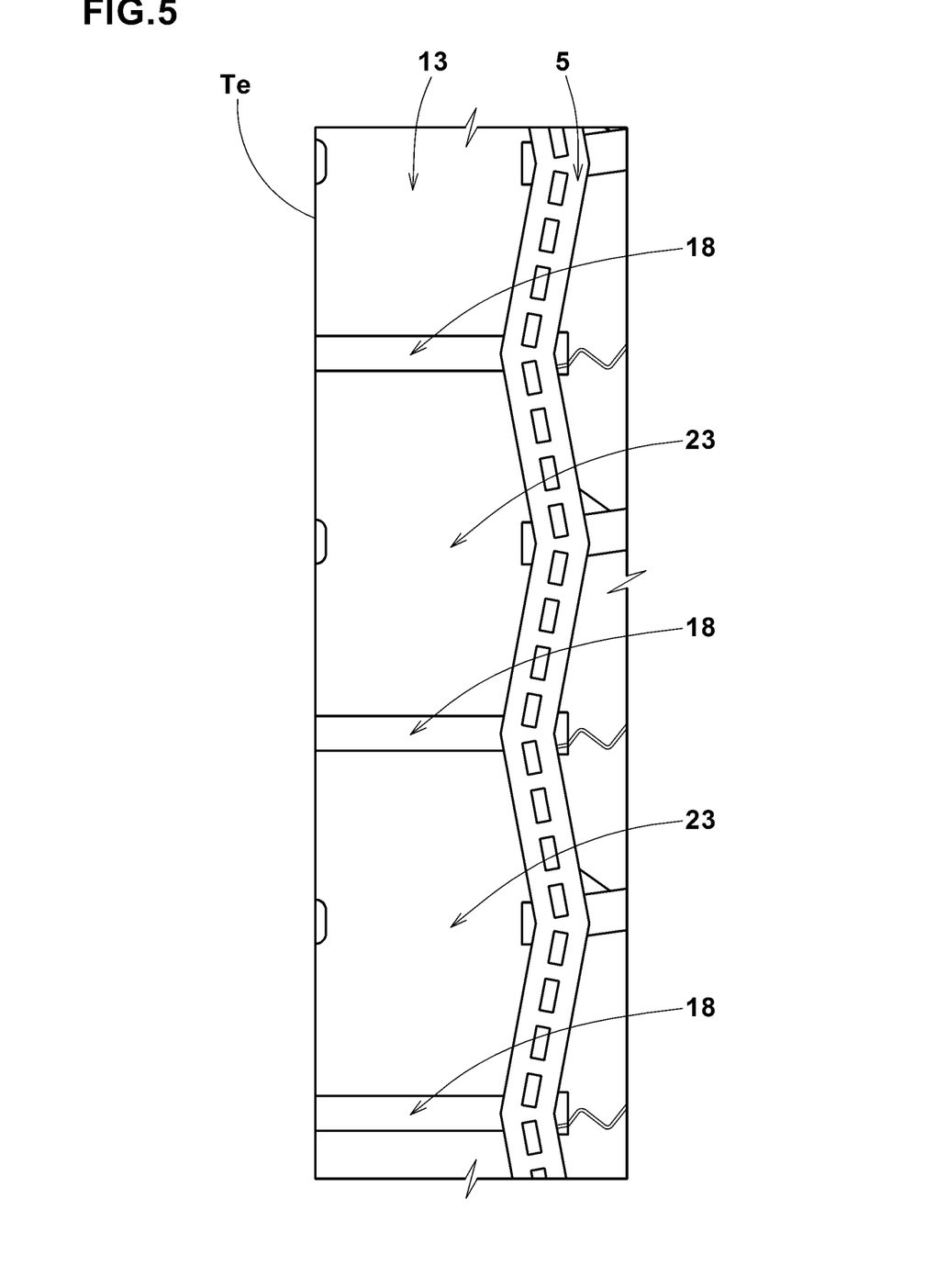
FIG. 5 is a closeup showing the shoulder land region in FIG. 1.

As shown in FIG. 5, in the shoulder land regions 13 in this example, shoulder blocks 23 are arranged in the tire circumferential direction. The shoulder blocks 23 are divided by shoulder axial grooves 18 extending from the shoulder main grooves 5 to the tread edges Te.

The shoulder axial groove 18 in this example extends straight in parallel with the tire axial direction. Preferably, the depth of the shoulder axial groove 18 is 0.05 to 0.25 times the depth of the shoulder main groove 5. Thus, as the tread portion is provided with the shoulder land regions 13 having higher rigidity, the load in the ground contacting parts of the center land region 11 and the middle land regions 12 (shown in FIG. 1) can be mitigated. Accordingly, the center land region 11 and the middle land regions 12 are further improved in the uneven wear resistance.

The shoulder block 23 in this example has a tread having a substantially pentagonal shape.

Preferably, the treads of the shoulder blocks 23 are provided with no sipe so that the shoulder blocks 23 can exert good durability.

while detailed description has been made of an especially preferable embodiment of the present invention, the present invention can be embodied in various forms without being limited to the illustrated embodiment Comparioson Tests Based on the tread pattern shown in FIG. 1, heavy duty pneumatic tires of size 11R822.5 (wheel rim: 22.5×8.25) having specifications listed in Table 1 were experimentally manufactured.

Figure 6:
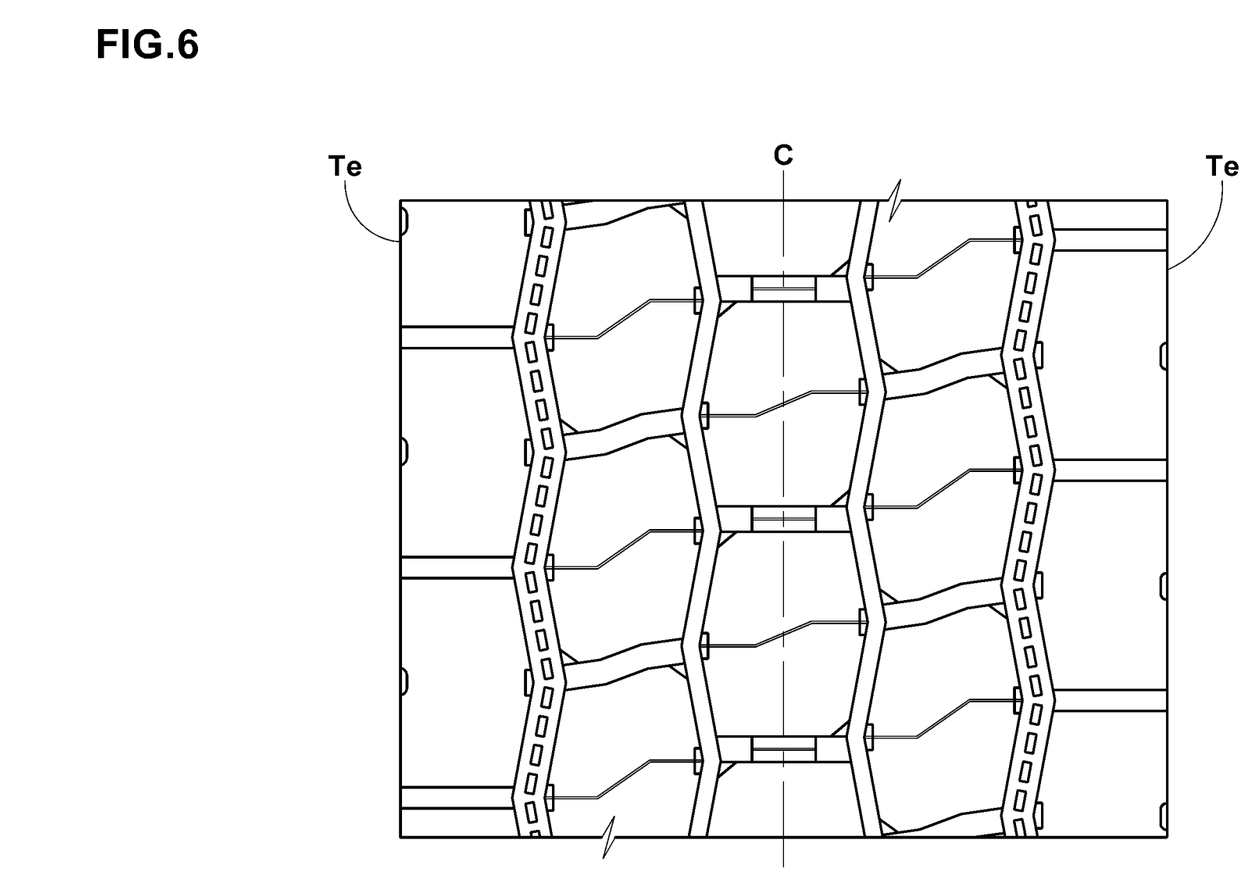
FIG. 6 is a developed plan view showing the tread portion of a pneumatic tire as a comparative example.

As a comparative example 1, a heavy duty pneumatic tire provided with a tread pattern shown in FIG. 6 was experimentally manufactured, wherein a crank shaped sipe was connected to the vertices of the block side walls.

As a comparative example 2, a heavy duty pneumatic tire provided with a tread pattern based on that shown in FIG. 1 was experimentally manufactured, wherein the ends of the first sipe were positioned at the vertices of the block side walls.

The test tires were tested for the wet performance, wear resistance and uneven wear.

Specifications common to all of the test tires are as follows.

tire pressure: 720 kPa
test vehicle: 10 ton truck loaded with 50% of the load capacity on the front part of the loading space
wheels on which test tires were mounted: all <Wet Performance Test>

On an asphalted road surface of a test course covered with 5 mm depth water, the time was measured which time was required to travel for ten meters when starting the test vehicle in the second gear while keeping the number of revolutions of the engine at 1500 rpm.

The results are indicated in Table 1 by an index based on the time of the comparative example 1 being 100, wherein the smaller the value, the better the wet performance.

<Wear Resistance Test>

Using the above-mentioned test vehicle, the amount of wear of the center blocks was measured after traveling on a dry road for a predetermined distance.

The results are indicated in Table 1 by an index based on the amount of wear of the comparative example 1 being 100, wherein the smaller the value, the better the wear resistance.

<Uneven Wear Test>

Using the above-mentioned test vehicle, the vicinities of the vertices of the block side walls were visually checked for whether uneven wear was caused or not after traveling on a dry road for a predetermined distance.

The results are shown in Table 1.

TABLE 1

| Tire | Ref. 1 | Ref. 2 | Ex. 1 | Ex. 2 | Ex. 3 | Ex. 4 | Ex. 5 | Ex. 6 | Ex. 7 |
|---|---|---|---|---|---|---|---|---|---|
| Tread pattern (FIG. No.) | 6 | 1 | 1 | 1 | 1 | 1 | 1 | 1 | 1 |
| Distance L6 from vertices to sipe ends (mm) | 0 | 0 | 2.0 | 1.0 | 5.0 | 2.0 | 2.0 | 2.0 | 2.0 |
| First and second portions' amplitude A1/Maximum circumferential length L1 | 0 | 0.10 | 0.10 | 0.10 | 0.10 | 0.05 | 0.30 | 0.10 | 0.10 |
| First sipe depth d2/center axial groove depth d1 | 0.65 | 0.65 | 0.65 | 0.65 | 0.65 | 0.65 | 0.65 | 0.35 | 1.00 |
| wet performance | 100 | 96 | 94 | 94 | 95 | 96 | 93 | 95 | 91 |
| wear resistance | 100 | 97 | 93 | 95 | 91 | 92 | 94 | 90 | 95 |
| uneven wear *1 | Y | Y | N | N | N | N | N | N | N |

*1 Y: uneven wear occurred, N: not occurred

As shown in Table 1, it was confirmed that the pneumatic tires as embodiments were improved in the uneven wear resistance.

DESCRIPTION OF THE SIGNS 2 tread portion
4 crown main groove
16 center axial groove
21 center block
25 first block side wall
26 second block side wall
27 vertex
30 first sipe

The invention claimed is:

1. A pneumatic tire comprising:
a tread portion provided with:
  a pair of crown main grooves disposed one on each side of the tire equator, and extending continuously in the tire circumferential direction,
  a plurality of center axial grooves connecting between a pair of the crown main grooves, and
  a plurality of center blocks divided by a pair of the crown main grooves and the center axial grooves,
wherein:
the center blocks include a siped center block,
the siped center block has a first block side wall and a second block side wall respectively extending along the pair of the crown main grooves, and is provided with a first sipe extending from the first block side wall to the second block side wall,
in the top view of the siped center block, each of the first block side wall and the second block side wall is substantially V shaped to have a vertex protruding outwardly of the siped center block, and the first sipe has a wavy configuration at least partially of its length, and one end in the tire axial direction of the first sipe is positioned on one side in the tire circumferential direction of the vertex of the first block side wall, whereas the other end in the tire axial direction of the first sipe is positioned on the other side in the tire circumferential direction of the vertex of the second block side wall, wherein:
the first sipe comprises:
  a first portion including said one end;
  a second portion including said other end; and
  a third portion extending from the first portion to the second portion, the third portion is straight and inclined at an angle $\theta1$ with respect to the tire axial direction, the first portion has said wavy configuration extending in the tire axial direction from one end of the third portion while oscillating in the tire circumferential direction, the second portion has said wavy configuration extending in the tire axial direction from the other end of the third portion while oscillating in the tire circumferential direction, and said wavy configuration is a zigzag configuration having zigzag segments, wherein each zigzag segment is straight and is shorter than the third portion, and an axial length of the third portion is in a range of 0.20 times to 0.35 times a maximum axial width of said siped center block, and wherein:
the siped center block is made up of two regions subdivided by the first sipe, each region provided with a second sipe whose both ends are terminated within the region, the second sipe protrudes from the extent in the tire axial direction of the third portion of said first sipe toward both sides thereof in the tire axial direction, each of said first block side wall and said second block side wall is provided with a slot denting in the tire axial direction and having a width in the tire circumferential direction which is constant in the tire axial direction, the slot of said first block side wall and the slot of said second block side wall are positioned so as to include the vertexes thereof within said widths of the respective slots, each of the slots has a sloping surface extending radially inwardly from the block's tread while inclining at an angle of from 10 to 20 degrees with respect to a radial direction of the tire, said one end and the other end of said first sipe are connected to the slot of the first block side wall and the slot of the second block side wall, respectively, and said wavy configuration has a peak-to-peak amplitude less than said widths of the slots in the tire circumferential direction.

2. The pneumatic tire according to claim 1, wherein:
each of the center blocks is said siped center block, and
the tread portion is further provided with a plurality of middle axial grooves extending axially outwardly from each of the crown main grooves, and
axially inner ends of the middle axial grooves are disposed at positions opposed to the respective vertices of the adjacent siped center blocks.

3. The pneumatic tire according to claim 2, wherein:
said one end of the first sipe is positioned within the extent in the tire circumferential direction of the middle axial groove being opposite to the vertex of the first block side wall, and
said other end of the first sipe is positioned within the extent in the tire circumferential direction of the opening to the crown main groove of the middle axial groove being opposite to the vertex of the second block side wall.

4. The pneumatic tire according to claim 1, wherein:
the tread portion is further provided with:
a pair of shoulder main grooves extending continuously in the tire circumferential direction and respectively disposed axially outside the crown main grooves,
a plurality of middle axial grooves connecting between the crown main grooves and the shoulder main grooves, and
two circumferential rows of middle blocks divided by the crown main grooves, the shoulder main grooves, and the middle axial grooves,
the middle blocks include a siped middle block,
the siped middle block is provided with a middle first sipe extending from a block side wall on one side in the tire axial direction to a block side wall on the other side in the tire axial direction,
the middle first sipe comprises:
a first portion and a second portion which are shifted from each other in the tire circumferential direction, and
a third portion extending straight between the first portion and the second portion while inclining with respect to the tire axial direction,
each of the middle axial grooves comprises, from the crown main groove side, a first portion, a second portion and a third portion which are inclined with respect to the tire axial direction to the same direction,
the angle with respect to the tire axial direction of the second portion of the middle axial groove is more than the angles with respect to the tire axial direction of the first portion and the third portion of the middle axial groove, and
the second portion of the middle axial groove has an axial length so as to protrude from the axial extent of the third portion of the middle first sipe toward both sides in the tire axial direction, and
wherein:
each of the center blocks is said siped center block,
each of the middle blocks is said siped middle block, and
each of the center axial grooves is a straight groove parallel with the tire axial direction.

5. The pneumatic tire according to claim 1, wherein:
a peak-to-peak amplitude measured in the tire circumferential direction of each of the first portion and the second portion of said first sipe is in a range of 0.05 to 0.20 times the maximum length in the tire circumferential direction of said siped center block.

6. The pneumatic tire according to claim 1, wherein:
said angle $\theta 1$ of the third portion is in a range of 40 to 60 degrees.

7. The pneumatic tire according to claim 1, wherein:
the axial length of the second sipe is in a range of 1.25 to 1.35 times the axial length of the third portion of said first sipe.

8. The pneumatic tire according to claim 1, wherein:
the second sipe is a zigzag sipe.

9. The pneumatic tire according to claim 8, wherein:
a zigzag amplitude of the second sipe is smaller than a zigzag amplitude of the first portion and the second portion of the first sipe.

10. The pneumatic tire according to claim 4, wherein:
in the top view of the siped middle block, each of the block side walls is substantially V-shaped to have a vertex protruding outwardly of the block, and the middle first sipe has a wavy configuration at least partially of its length, and
one end in the tire axial direction of the middle first sipe is positioned on one side in the tire circumferential direction of the vertex of one of the block side walls, whereas the other end in the tire axial direction of the middle first sipe is positioned on the other side in the tire circumferential direction of the vertex of the other of the block side walls,
wherein:
the first portion of the middle first sipe has said wavy configuration extending in the tire axial direction from one end of the third portion while oscillating in the tire circumferential direction,
the second portion of the middle first sipe has said wavy configuration extending in the tire axial direction from the other end of the third portion while oscillating in the tire circumferential direction, and
said wavy configuration is a zigzag configuration having zigzag segments, wherein each zigzag segment is straight and is shorter than the third portion, and an axial length of the third portion is in a range of 0.20 times to 0.35 times the maximum axial width of said siped middle block.

11. The pneumatic tire according to claim 10, wherein:
the siped middle block is made up of two regions subdivided by the middle first sipe and each region is provided with at least one middle second sipe,
each middle second sipe protrudes from the extent in the tire axial direction of the third portion of the middle first sipe toward the both sides thereof in the tire axial direction, and
both ends of each said middle second sipe terminate within the siped middle block.

12. The pneumatic tire according to claim 11, wherein:
each said middle second sipe is a zigzag sipe.

13. The pneumatic tire according to claim 12, wherein:
a zigzag amplitude of each said middle second sipe is smaller than a zigzag amplitude of the first portion and the second portion of the middle first sipe.

* * * * *